United States Patent Office 2,988,524
Patented June 13, 1961

2,988,524
COPOLYMER OF METHYL METHACRYLATE, ALKYD RESIN AND MODIFIED GLYCIDYL METHACRYLATE AND COATING COMPOSITION COMPRISING SAME
Robert M. Fitch, Bala-Cynwyd, Pa., assignor to E. I. du Pont de Nemours and Company, Wilmington, Del., a corporation of Delaware
No Drawing. Filed June 19, 1958, Ser. No. 743,002
5 Claims. (Cl. 260—16)

This invention relates to chemical compound and more particularly to a copolymer of methyl methacrylate and to coating compositions thereof.

Polymers of methyl methacrylate have found wide use in coating compositions. Methyl methacrylate lacquers, that is, coating compositions containing as the principal film-forming constituent, polymers of methyl methacrylate, can be applied to substrates and dried to form films or coatings which have outstanding durability and gloss retention.

Unfortunately, coating compositions containing conventional polymers of methyl methacrylate have certain limitations. First, coating compositions containing conventional polymers of methyl methacrylate do not adhere well to conventional rust-inhibiting and metal-protecting prime coats. When methyl methacrylate lacquers are applied over conventional primers, such as those commonly used under alkyd resin enamels, aminoaldehyde enamels and nitrocellulose lacquers, the methyl methacrylate lacquers crack and do not adhere well. Also, dried coatings of known methyl methylacrylate lacquers have poor craze resistance. Crazing refers to the multiplicity of cracks which appear in methyl methacrylate lacquer coatings when they come in contact with solvents as occurs, for example, when blemishes in the coatings are refinished. Compounds, such as amine-modified montmorillonite clays, when added to methyl methacrylate lacquers to improve craze resistance, decrease the unbuffed gloss of the dried lacquer coatings, thus necessitating costly buffing operations to bring out the desired coating gloss. Furthermore, other resins, plasticizers and additives conventionally added to methyl methacrylate lacquers cause problems such as incompatibility, thermoplasticity and crazing.

I have found a copolymer of methyl methacrylate which can be formulated into coating compositions which have excellent durability and gloss retention and which additionally adhere well to conventional primers and have an excellent balance of craze resistance, unbuffed gloss, freedom from thermoplasticity and other desirable film-forming properties.

The polymers of this invention are copolymers containing chemically combined in the polymer chain in each 100 parts by weight thereof at least 30 parts by weight of methyl methacrylate, about from 10 to 50 parts by weight of monocarboxylic acid modified alkyd resin and about from 0.2 to 20 parts by weight exclusive of amino residue of the aminated or ammoniated glycidyl methacrylate radical:

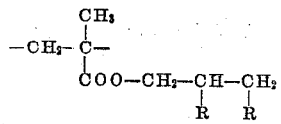

wherein one R is selected from the class consisting of a hydroxyl group and an oxygen anion and the second R is an amino residue of a member of the class consisting of ammonia and monoamines, said residue being bonded through amino nitrogen. Preferably, the copolymers contain about from 50 to 70 parts by weight of methyl methacrylate, about from 25 to 40 parts by weight of monocarboxylic acid modified alkyd resin and about from 1 to 5 parts by weight of the aminated or ammoniated glycidyl methacrylate radical exclusive of amino residue.

The copolymers are preferably prepared by first forming a monocarboxylic acid modified alkyd resin containing about 1 to 10% based on the total weight of resin of an ethylenically unsaturated mono- or polycarboxylic acid. Next, the alkyd resin, methyl methacrylate, glycidyl methacrylate and, if desired a small portion of another copolymerizable ethylenically unsaturated monomer are copolymerized. Finally, the resulting copolymer is animated or ammoniated. Alternately, an ethylenically unsaturated monomer corresponding to the aforementioned ammoniated or aminated glycidyl methacrylate radical can be substituted for glycidyl methacrylate in the copolymerization step to yield the products of this invention directly. For example, an aminated copolymerizable monomer can be prepared by reacting a secondary amine such as diethyl amine with an epihalohydrin such as epichlorohydrin, then reacting the resulting product with methacrylic acid.

The monocarboxylic acid modified alkyd resins can be prepared by the conventional procedure of heating together at least one polycarboxylic acid, at least one polyol, at least one monocarboxylic acid or monocarboxylic acid-contributing material such as a vegetable oil and 1 to 10% by weight of ethylenically unsaturated acid at a temperature of about 150 to 250° C. until an alkyd resin having the desired acid number is reached. A preferred procedure is to heat a vegetable oil and a polyol together at a temperature of about from 150 to 250° C. for about 20 to 60 minutes in the presence of a basic catalyst such as litharge or calcium oxide, then add the remainder of the reactants and continue the reaction until the desired acid number is reached. A small amount of vinyl polymerization inhibitor such as hydroquinone or tertiary amyl nitrite can be used to prevent homopolymerization of the unsaturated acid. The preferred alkyd resins have an acid number of 10 or less and preferably 5 or less, an oil length of 15 to 55 and preferably 20 to 35 and 1 to 6% and preferably 3 to 5% of unreacted hydroxyl. Oil length means the percent by weight of monocarboxylic acid used in preparing the resin expressed as percent by weight of triglyceride based on the total weight of resin. Acid number is the number of milligrams of potassium hydroxide necessary to neutralize the acidity of one gram of alkyd resin. Percent of unreacted hydroxyl means the percent by weight of glycerol based on the total weight of resin which has an amount of unreacted hydroxyl groups equivalent to that of the resin. As is conventional in the coating art, the unreacted hydroxyl and oil length are based on glycerol whether or not glycerol is used as the polyol.

Polycarboxylic acids such as oxalic acid, malonic acid, succinic acid, sebacic acid, adipic acid, pimelic acid, suberic acid, azelaic acid, tricarballylic acid, citric acid, tartaric acid, phthalic acid, isophthalic acid, terephthalic acid, and mixtures thereof can, among others, be used in preparing the alkyd resins employed in this invention. Of course, any of the anhydrides of the aforementioned acids can be used in equivalent amounts in place of the acids. Phthalic acid or anhydride is a preferred constituent of the polycarboxylic acid component.

The monocarboxylic acid component can be introduced either as an oil or as a free acid. Oils which can be used to introduce the monocarboxylic acid component are, for example, non-drying oils such as coconut oil, palm oil, castor oil and olive oil; semi-drying oils such as soybean oil, corn oil, menhaden oil, cotton seed oil and cod-liver oil and drying oils such as dehydrated castor oil, tung oil, oiticica oil, linseed oil and perilla oil. Free monocarboxylic acids are, for example, propionic acid, butyric acid, valeric acid, benzoic acid, decanoic acid, p-tertiary butyl benzoic acid, toluic acid, and fatty acids derivable from the aforementioned oils such as linolenic, palmitic, lauric, capric, caprylic, myristic, stearic and oleic acids.

Typical polyols useful in the alkyd resin are, for example, ethylene glycol, tetramethylene glycol, hexamethylene glycol, 1,1,1-trimethylol propane, 1,1,1-trimethylol ethane and glycerol. Diols such as ethylene glycol and tetramethylene glycol together with glycerol in the form of oils are the preferred polyols.

Although ethylenically unsaturated polycarboxylic acids such as maleic acid, itaconic acid and citraconic acid can be used to provide sites for the subsequent vinyl copolymerization, 1 to 6 carbon atom $\alpha,\beta$-unsaturated monocarboxylic acids such as acrylic, methacrylic and ethacrylic acids and similar monocarboxylic acids having activated ethylenic unsaturation are preferred because they copolymerize readily to yield products with little residual unsaturation and, as a result, better durability. About from 1 to 5% by weight based on the total weight of resin of methacrylic acid is preferred.

Next, the alkyd resin, methyl methacrylate, glycidyl methacrylate, vinyl polymerization initiator and preferably solvent are mixed together and heated at about from 50 to 150° C. and preferably at about from 75 to 100° C. until the copolymerization reaction is substantially complete, for example, until 95% by weight of the monomers are converted to polymer as determined by heating a sample of the reaction mixture in a weighing dish for one hour at 150° C. The particular time and temperature of the reaction depend to a large extent upon the polymerization initiator used and its decomposition temperature; usually the reaction takes about from 2 to 16 hours. Other ethylenically unsaturated copolymerizable monomers which do not react with the epoxy group in the glycidyl methacrylate or with the amine or ammonia residues can be added to the reaction mixture. Such monomers are, for example, butyl acrylate, methyl acrylate, ethyl hexyl acrylate, butyl methacrylate, lauryl methacrylate, acrylonitrile, styrene, vinyl acetate and vinyl chloride.

Free-radical initiators such as benzoyl peroxide, di-tertiarybutyl peroxide, cumene hydroperoxide, $\alpha,\alpha'$-azobisisobutyronitrile, diacetyl peroxide and dilauroyl peroxide are examples of initiators which can be used. Solvents for the reaction are, for example, toluene, xylene, benzene, dimethyl formamide, tetrahydrofuran, methyl "Cellosolve" and diethylene glycol.

Finally, the copolymer described above is reacted with ammonia or a monoamine. Primary amines such as tertiary butyl amine, ethanolamine, ethyl amine and tertiary octyl amine; secondary amines such as dimethyl amine, diethanolamine and methyl ethyl amine and tertiary amines such as dimethyl benzyl amine, N-methyl morpholine, dimethyl palmityl amine and triethanol amine are illustrative monoamines which can be used to aminate the glycidyl methacrylate radical. Ammonia and simple aliphatic primary and secondary amines such as for example, 1 to 4 carbon alkyl and alkanol amines are preferred because they show little steric hindrance, thus react rapidly, and because of the high stability of products made therewith. Ammonia is particularly preferred because it reacts rapidly and because it is relatively inexpensive.

The monoamine or ammonia and copolymer are mixed, then heated, preferably in a closed system under a pressure of about 20 to 100 p.s.i., until the reaction between the monoamine or ammonia and the epoxy groups in the copolymer has run substantially to completion. The particular reaction conditions vary with the amount and reactivity of the monamine or ammonia. Usually, the reaction mixture is heated for from 2 to 30 hours and preferably 5 to 10 hours at about from 50 to 150° C. and preferably 85 to 100° C. Preferably, an excess of the monoamine or ammonia is added to the reaction mixture. This speeds the reaction and reduces the tendency towards gelation or excessive viscosity during and after reaction. Useful products are obtained when less than the equivalent amount of monoamine or ammonia is used; however, the resulting products are somewhat less stable and often cannot be stored for long periods of time. The stability of incompletely reacted copolymers can be improved by adding for example, ethyl acetate, butyl acetate, amyl acetate, or acetic acid to the reaction mixture. The amount of unreacted epoxy groups can be determined by adding hydrochloric acid to a portion of the reaction mixture, then back titrating the resulting solution with silver nitrate.

The amination or ammoniation reaction can be carried out in volatile solvents, such as, for example, toluene, xylene, methyl isobutyl ketone, butyl alcohol, amyl alcohol, isopropyl alcohol and other aliphatic, cycloaliphatic and aromatic hydrocarbons, ethers, ketones and alcohols, such as are conventionally used in coating compositions. Hydroxylated solvents such as alcohols are preferred because they catalyze the amination reaction. Small portions of water also can be added to the solvent mixture to catalyze the reaction.

During the amination or ammoniation reaction, the epoxy ring on the glycidyl methacrylate moiety opens and the ammonia or monoamine is bonded to one of the ring carbon atoms through amino nitrogen. In the case of ammonia or hydrogen-bearing monoamines, a hydroxyl group is formed on the second carbon atom. For example, in the case of ammonia the reaction proceeds substantially as follows:

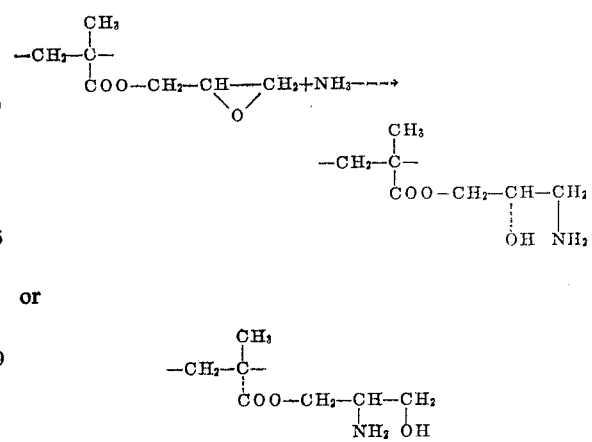

or in the case of tertiary amines, an internal quaternary ammonium alkoxide is believed to be formed. For example, with dimethyl benzyl amine the reaction is believed to be

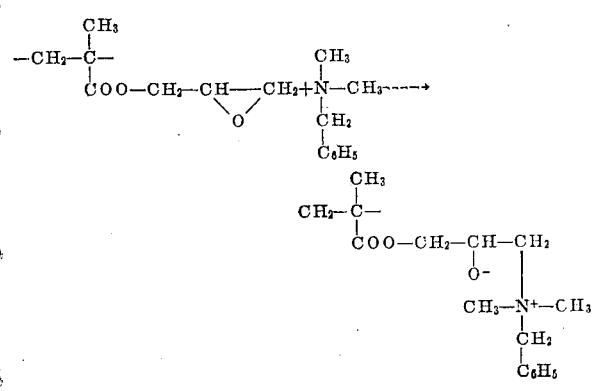

or

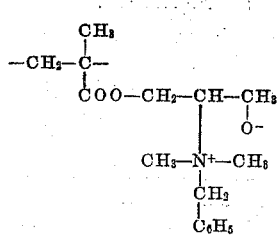

The copolymers of this invention are particularly useful in coating compositions. Solvents such as those used in the amination or ammoniation reaction, pigments, and modifiers such as dispersing agents and flow-control agents can be added to such compositions in proportions normally used in the art. Examples of pigments are metal oxides, hydroxides, chromates, silicates, sulfides, sulfates, carbonates, and carbon blacks, organic dyestuffs and lakes thereof and metal flake pigments. Other film-forming materials which are compatible and do not react with the copolymers of this invention can, if desired, be added to the coating compositions of this invention in small amounts, for example, up to 30% based on the total weight of film-forming materials. Such film-forming materials are, for example, polymers and copolymers of methyl methacrylate, ethyl methacrylate, butyl methacrylate, vinyl acetate, vinyl chloride, acrylonitrile and cellulose acetate butyrate and alkyd resins similar to those described above. Of these, cellulose acetate butyrate is particularly preferred.

The coating compositions of this invention can be applied by conventional methods such as spray, brush, roller, dip, and knife coating and dried at room temperature or preferably at elevated temperature, for example, at about 100° C. for 30 minutes. The dried coatings have excellent durability and gloss retention and are free of plasticizer. They adhere well to a wide variety of substrates including, for example, those of wood, metal, glass and particularly substrates coated with conventional prime coating compositions. In addition, the dried coatings have an excellent balance of craze resistance, unbuffed gloss and freedom from thermoplasticity.

The following examples are intended to illustrate the invention and not to limit it in any way. Parts and percentages are by weight unless otherwise specified.

EXAMPLE I

*Preparation of ammoniated copolymer*

An alkyd resin is prepared by first heating, in a nitrogen atmosphere in a vessel equipped with a reflux condenser and water separator, 2400 parts of coconut oil, 3684 parts of ethylene glycol and 6 parts of litharge at about 200° C. for about 30 minutes. Next, 7452 parts of phthalic anhydride, and 360 parts of methacrylic acid are added to the reaction mixture and heating is continued with water removal until the acid number of the resin is about 2.5. Toluene is added periodically to hold the reaction temperature at about 225° C. The resulting alkyd resin has an oil length of 18.6, an acid number of 2.5, about 3% of unreacted hydroxyl groups expressed as percent by weight of glycerine based on the total weight of resin and unsaturation, expressed as percent by weight of methyl methacrylate, of 1.97%.

The following materials are charged into a closed reaction vessel and heated at about 80° C. for 16 hours:

| | Parts |
|---|---|
| Alkyd resin (described above) | 40.0 |
| Methyl methacrylate | 58.0 |
| Glycidyl methacrylate | 2.0 |
| Benzoyl peroxide-initiator | 0.7 |
| Toluene | 150.0 |
| | 250.7 |

The resulting terpolymer solution contains 39.6% solids and has a viscosity at 25° C. of 5 poises.

An ammoniated terpolymer is prepared by charging 125 parts of the 39.6% terpolymer solution described above, 3.2 parts of anhydrous ammonia and 75 parts of isopropyl alcohol to a sealed reaction vessel and heating the resulting mixture at 95° C. for 4.5 hours. The resulting ammoniated terpolymer has substantially no free epoxy groups and contains 0.22% of combined ammonia determined by the standard Kjehldahl method.

*Evaluation of copolymer*

Steel panels treated with conventional rust inhibitor ("Bonderite," a product of the Parker Rust-Proof Co.) are prime coated with a conventional primer containing 100 parts of 52% soya oil modified glyceryl phthalate as the film-forming material and pigment consisting of 39 parts of calcium carbonate, 9 parts of carbon black and 5 parts of zinc chromate. The prime coat is baked for 25 minutes at 200° C. to give a coating about 0.5 mil thick.

A 40% solution of the ammoniated terpolymer described above is knife-coated onto the primed steel panels and baked at 93° C. for 30 minutes to yield a dry film about 2 mils thick. The coated panels are tested for adhesion of the primer to the metal and for intercoat adhesion by cutting two two-inch long marks in the form of an "X" vertically through the coating down to the metal, securely pressing a strip of pressure-sensitive cellophane adhesive tape over the "X," then pulling the adhesive tape off with a force approximately tangential to the coated surface. When the tape test is done on the coated panels of this example, none of the coatings are removed with the tape. When the same test is made on panels which have the same baked prime coats and conventional methyl methacrylate lacquer topcoats, for example, a lacquer containing as the principal film-forming constituent a copolymer of 98% methyl methacrylate and 2% of methacrylic acid, almost all of the lacquer topcoat under the tape is stripped from the prime coat.

Fifty parts of the 39.6% ammoniated terpolymer solution described above are ground with 29 parts of xylene and 83.7 parts of titanium dioxide pigment until a smooth uniform mill base is formed. Next, about 24 more parts of the polymer solution are mixed with the mill base and the resulting coating composition is sprayed onto the prime coated panels described above and dried at 93° C. for 30 minutes to yield a topcoat 2 mils thick. The coated panels show no crazing when a drop of methyl ethyl ketone is placed on the topcoat held at about 16° C. and 40% relative humidity. The 60° unbuffed gloss of the coating is 79. Unbuffed gloss is determined with a universal Gloss Meter, Model J–2, in accordance with A.S.T.M. Specification TM–204C. A coating of conventional methyl methacrylate lacquer containing sufficient dimethyl dioctadecyl ammonium bentonite to give craze resistance comparable to that of the coating just described has an unbuffed gloss of 39. The pigmented composition of this invention just described also has excellent adhesion comparable to that of the clear coating of this example and gasoline resistance superior to that of conventional methyl methacrylate lacquer coatings. The freedom from thermoplasticity of the composition of this invention described above was also satisfactory. Thermoplasticity is tested by laying a gauze over the dried coating and applying a pressure of 4 pounds per square inch to the gauze. After the sample has been held for 1 hour at about 66° C., the pressure is removed and the impression, if any, of the gauze in the coating is noted.

EXAMPLE II

A copolymer is prepared by mixing the following materials, then heating the mixture at 85° C. for 16 hours in a closed reaction vessel:

| | Parts |
|---|---|
| Alkyd resin (Same as Example I) | 140 |
| Methyl methacrylate | 256 |
| Glycidyl methacrylate | 4 |
| Benzoyl peroxide | 1.9 |
| Toluene | 260 |
| | 661.9 |

The resulting solution contains 0.24% of unreacted monomer expressed as percent by weight of methyl methacrylate. The terpolymer has 0.242% of epoxide groups determined by titration with hydrochloric acid and back titration with silver nitrate.

The solution described above is diluted to 27.7% solids with 303 parts of toluene and 515 parts of isopropyl alcohol, then the diluted solution and 12 parts of anhydrous ammonia are charged to a sealed reaction vessel and heated at about 90° C. for 16.5 hours. The resulting ammoniated copolymer contains substantially no unreacted epoxy groups and contains about 0.085% of combined ammonia.

The ammoniated copolymer solution described above is applied to prime-coated steel panels similar to those described in the preceding example and dried at 93° C. for about 30 minutes to yield a clear film having excellent adhesion, gasoline resistance, unbuffed gloss and resistance to exudation. Exudation is measured by heating the coating at about 66° C. for 3 days, then noting any oily film which appears on the surface of the sample. The coating also has good craze resistance and freedom from thermoplasticity.

EXAMPLE III

A coating composition is prepared by grinding together 20 parts of the ammoniated terpolymer described in Example I, about 84 parts of titanium dioxide, and solvent consisting of a mixture of 29 parts of xylene, about 15 parts of toluene and about 15 parts of isopropyl alcohol to form a mill base. Next, 212 parts of a 40% solution in isopropyl alcohol and toluene of the ammoniated terpolymer and 11.6 parts of half-second viscosity cellulose acetate butyrate are mixed with the mill base. The resulting coating composition is applied to prime-coated steel panels similar to those used in the preceding examples and dried at 93° C. for 30 minutes. The resulting coating has excellent freedom from thermoplasticity, adhesion, unbuffed gloss, durability and craze resistance.

EXAMPLE IV

A coconut oil modified alkyd resin having an acid number of 0.63, an oil length of 40, about 3% of unreacted hydroxyl groups and containing 2.6% of methacrylic acid is prepared by the general procedure described in Example I. About 140 parts of this alkyd resin, 256 parts of methyl methacrylate, 4 parts of glycidyl methacrylate, 1.9 parts of benzoyl peroxide and about 255 parts of toluene are heated together at about 90° C. for 16 hours. Next, the resulting solution is diluted with 303 parts of toluene and 515 parts of isopropyl alcohol and heated with 12 parts of anhydrous ammonia for 16.5 hours at about 90° C. The resulting copolymer contains about 0.10% of combined ammonia and contains substantially no unreacted epoxy groups. This copolymer has properties similar to the properties of the copolymers of the preceding examples.

If hydrogenated castor oil is substituted for coconut oil in preparing alkyd resins as described hereinbefore, the ammoniated copolymers made with the resulting resins have properties similar to the properties of the copolymers of the preceding examples.

EXAMPLE V

An alkyd resin is prepared by heating together the following ingredients in an inert atmosphere at a temperature of 175 to 225° C. until an acid number of 5 is reached.

| | Parts |
|---|---|
| Ethylene glycol | 26.4 |
| Glycerine | 2.4 |
| Phthalic anhydride | 53.5 |
| Paratertiarybutyl benzoic acid | 14.1 |
| Methacrylic acid | 2.6 |
| Toluene | 1.0 |
| | 100.0 |

Toluene is added from time to time during the reaction to keep the reaction temperature below 225° C.

Thirty-five parts of the resulting alkyd resin, 63 parts of methyl methacrylate, 2 parts of glycidyl methacrylate, 0.5 part of benzoyl peroxide and 65 parts of toluene are heated together in a closed reaction vessel for about 16 hours at 90° C. to yield a solution of terpolymer. Finally, the terpolymer solution is diluted with about 75 parts of toluene and 125 parts of isopropyl alcohol and heated with 3 parts of anhydrous ammonia at 90° C. for 17 hours in a closed vessel to yield a copolymer of this invention.

EXAMPLE VI

A copolymer is prepared from 20 parts of the monocarboxylic acid modified alkyd resin prepared in Example I, 70 parts of methyl methacrylate and 10 parts of glycidyl methacrylate by the procedure shown in that example. Four-hundred parts of a 25% solution of the resulting copolymer in an equal weight mixture of toluene and isopropyl alcohol are heated in a closed reaction at a temperature of 90° C. for 24 hours with 3.2 parts of dimethyl amine to yield an aminated copolymer having properties similar to those of the copolymers of this invention shown in the preceding examples.

EXAMPLE VII

A copolymer is prepared from 35 parts of the monocarboxylic acid modified alkyd resin prepared in Example I, 62 parts of methyl methacrylate and 3 parts of glycidyl methacrylate by the general procedure shown in that example. Four-hundred parts of a 25% solution of the resulting copolymer in an equal weight mixture of toluene and isopropyl alcohol are heated in a closed vessel at a temperature of 90° C. for 72 hours with 1.6 parts of tertiary butyl amine to yield an aminated copolymer of this invention having properties similar to the products of the preceding examples.

If this example is repeated except that 5 parts of N,N-dimethyl benzyl amine are substituted for the 1.6 parts of tertiarybutyl amine, a polymer of this invention with similar properties is obtained.

EXAMPLE VIII

Forty parts of the monocarboxylic acid modified alkyd resin described in Example I, 48 parts of methyl methacrylate, 10 parts of acrylonitrile, 2 parts of glycidyl methacrylate, 0.7 part of benzoyl peroxide and 150 parts of toluene are charged to a closed reaction vessel and heated for 16 hours at 80° C. Next, 125 parts of the resulting solution, 75 parts of isopropyl alcohol and 3.2 parts of ammonia are charged to a closed reactor and heated for 4.5 hours at 95° C. to give an ammoniated copolymer of this invention.

EXAMPLE IX

Thirty-five parts of the monocarboxylic acid modified alkyd resin described in Example I, 40 parts of methyl methacrylate, 20 parts of butyl methacrylate, 5 parts of glycidyl methacrylate, 0.7 part of benzoyl peroxide and 150 parts of toluene are charged to a closed reactor and heated for 16 hours at 80° C. Four hundred parts of a 25% solution of the resulting copolymer in an equal weight mixture of toluene and isopropyl alcohol are heated in a closed reactor at a temperature of 90° C. for 24 hours with 1.6 parts of dimethyl amine to yield an aminated copolymer of this invention having properties similar to the products of the preceding examples.

I claim:

1. A copolymer containing chemically combined in the polymer chain in each 100 parts by weight thereof (a) at least 30 parts by weight of methyl methacrylate, (b) about from 10 to 50 parts by weight of monocarboxylic acid modified alkyd resin, said resin containing in chemical combination monocarboxylic acid, polyol, polycarboxylic acid free of ethylenic unsaturation and about from 1 to 10% by weight of ethylenically unsaturated acid, and (c) about from 0.2 to 20 parts by weight exclusive of amino residue of the radical:

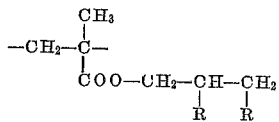

wherein one R is selected from the class consisting of a hydroxyl group and an oxygen anion and the second R is an amino residue of a member of the class consisting of ammonia and monoamines, said residue being bonded through amino nitrogen.

2. A copolymer containing chemically combined in the polymer chain in each 100 parts by weight thereof (a) about from 50 to 70 parts by weight of methyl methacrylate, (b) about from 25 to 40 parts by weight of monocarboxylic acid modified alkyd resin, said resin containing in chemical combination monocarboxylic acid, polyol, polycarboxylic acid free of ethylenic unsaturation and about from 1 to 10% by weight of alpha,beta-unsaturated monocarboxylic acid and (c) about from 1 to 5 parts by weight exclusive of amino residue of the radical:

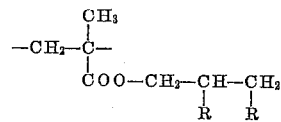

wherein one R is selected from the class consisting of a hydroxyl group and an oxygen anion and the second R is an amino residue of a member of the class consisting of ammonia and monoamines, said residue being bonded through amino nitrogen.

3. A copolymer of claim 2 wherein in said radical one R is a hydroxyl group and the second R is $-NH_2$.

4. A coating composition which comprises organic solvent and as the essential film-forming material a copolymer of claim 1.

5. A coating composition which comprises organic solvent and as the essential film-forming constituents a copolymer of claim 1 and cellulose acetate butyrate.

References Cited in the file of this patent

UNITED STATES PATENTS

| | | |
|---|---|---|
| 2,606,175 | Price | Aug. 5, 1952 |
| 2,737,452 | Catlin et al. | Mar. 6, 1956 |
| 2,781,333 | Updegraff | Feb. 12, 1957 |
| 2,872,423 | Goldstein | Feb. 3, 1959 |